United States Patent [19]

Cavanaugh

[11] Patent Number: 4,514,537

[45] Date of Patent: Apr. 30, 1985

[54] TETRAFLUOROETHYLENE POLYMER DISPERSIONS

[75] Inventor: Robert J. Cavanaugh, Vienna, W. Va.

[73] Assignee: E. I. Du Pont de Nemours and Company, Wilmington, Del.

[21] Appl. No.: 578,656

[22] Filed: Feb. 9, 1984

[51] Int. Cl.³ ............................................. C08K 5/54
[52] U.S. Cl. .................................. 524/265; 524/520
[58] Field of Search ............................ 524/265, 520

[56] References Cited

U.S. PATENT DOCUMENTS

| | | | |
|---|---|---|---|
| 3,132,123 | 5/1964 | Harris, Jr. et al. | 526/236 |
| 3,142,665 | 7/1964 | Cardinal et al. | 526/255 |
| 4,370,376 | 1/1983 | Gangal et al. | 428/241 |

Primary Examiner—Joseph L. Schofer
Assistant Examiner—N. Sarofim

[57] ABSTRACT

Tetrafluoroethylene polymer coating dispersions when coated on glass fabric improve flex life of the fabric if the dispersions contain a selected silane, siloxane, water repellant, and polyethylene oxide surfactant of the formula $C_9F_{17}O(CH_2CH_2O)_5CH_3$.

7 Claims, No Drawings

TETRAFLUOROETHYLENE POLYMER DISPERSIONS

FIELD OF THE INVENTION

This invention relates to aqueous dispersions of tetrafluoroethylene polymers and to coatings of such dispersions on glass fabric.

BACKGROUND OF THE INVENTION

Fabric made of glass fiber is useful in filter applications to separate particles from a gas stream. Commonly, the glass fabric is coated with a tetrafluoroethylene polymer coating, usually polytetrafluoroethylene (PTFE), to increase the flex life, i.e., resistance to breaking on repeated flexing of the fabric. Such a coating is especially useful when the glass fabric is employed as a filter bag to filter out particulate solid impurities such as carbon black or fly ash which may be present in flue gases. Due to the passage of hot flue gases through the glass fabric and due to back flushing or pulse flushing during cleaning, the fabric is subjected to flexural stresses which weaken the glass fibers of the fabric and ultimately cause breakage.

While the tetrafluoroethylene polymer coating increases the flex life of the glass fabric, resistance of the coated glass fabric to attack by acids present in hot flue gases is of concern. Many hot flue gases contain oxides of sulfur and water vapor which combine to form an acidic environment. Glass fabric coated with tetrafluoroethylene polymer coatings heretofore were subject to attack by acids in the flue gas which weakened the fabric and shortened the fabric's flex life. Recently, U.S. Pat. No. 4,370,376 described a composition which, when coated on a glass fabric, imparted resistance to attack by acids. This composition was a tetrafluoroethylene aqueous dispersion which contained a selected silane, a selected siloxane and a fluorinated ester of acrylic acid. While these dispersions enhance flex life of glass fabrics on which the dispersions are coated, it is always desirable to increase flex life further.

SUMMARY OF THE INVENTION

It has now been discovered that tetrafluoroethylene polymer coating dispersions which impart improved flex life to glass fabric coated with the dispersion can be obtained by employing in the coating dispersion a polyethylene oxide surfactant of the formula $C_9F_{17}$—$O(CH_2CH_2O)_n$—$R$ wherein n is an integer of 1 through 10 and R is hydrogen or alkyl of 1–10 carbon atoms. The dispersion also will contain a water-soluble, polyhydrolyzable silane, a fluorinated acrylate water-repellant additive, and a siloxane.

Specifically, the composition of this invention is an aqueous dispersion consisting essentially of (a) water, (b) 2–65% by weight tetrafluoroethylene polymer, said weight based on weight of water and polymer, said polymer being of film-forming molecular weight.

(c) 2–60% by weight of a polyhydrolyzable silane of the formula

wherein R is lower alkyl, preferably alkyl of 1–3 carbon atoms, and $R_1$ is phenyl or substituted lower alkyl, preferably of 1–3 carbon atoms, in which the substituents are selected from halogen, quaternary ammonium, or —NR'R" in which R' and R" are each H, lower alkyl, lower alkoxyalkyl, amino lower alkyl, hydroxyl lower alkyl, or substituted (amino lower alkyl), said weight based on weight of tetrafluoroethylene polymer, (d) 1–20% by weight of a hydrocarbyl siloxane, said weight based on weight of tetrafluoroethylene polymer, (e) 1–20% by weight of a polymer of a fluorinated ester of an acrylic acid, said weight based on weight of tetrafluoroethylene polymer, and (f) 1–12% by weight of $C_9F_{17}O(CH_2CH_2O)_nR$ wherein n and R are defined above, said weight based on weight of tetrafluoroethylene polymer.

DESCRIPTION OF THE INVENTION

The tetrafluoroethylene polymer in the compositions of this invention can consist of the homopolymer, polytetrafluoroethylene, or can be a copolymer of tetrafluoroethylene with a minor proportion, e.g. up to 35% by weight based on weight of copolymer, of another copolymerizable ethylenically unsaturated monomer. For example, the homopolymer can include small amounts of comonomer modifier, wherein the homopolymer still retains its non-melt fabricable character, such as up to two percent by weight of polymer units derived by copolymerization with tetrafluoroethylene of perfluoroalkyl or oxyperfluoroalkyl trifluoroethylene of 3 to 10 carbon atoms, and preferably hexafluoropropylene, as disclosed in U.S. Pat. No. 3,142,665 to Cardinal, Edens, and Van Dyk or perfluoro(alkyl vinyl ether). Larger amounts of these comonomers or other comonomers render the resultant copolymer melt fabricable. Examples of such copolymers include copolymers of tetrafluoroethylene with such monomers as hexafluoropropylene, as disclosed in U.S. Pat. No. 3,946,763 and Bro and Sandt, higher perfluoroalkenes such as those containing from 4 to 10 carbon atoms, perfluoro(alkyl vinyl ethers) such as perfluoroethyl or perfluoropropyl vinyl ether, disclosed in U.S. Pat. No. 3,132,123 to Harris and McCane, perfluoro-(2-methylene-4-methyl-1,3-dioxolane) disclosed in U.S. Pat. No. 3,308,107 to Selman and Squire, and the highly fluorinated monomers in which a single hydrogen is present which does not change the fluorocarbon character of the copolymer, such monomers being for example 2-hydroperfluoroalkene containing 1 to 3 carbon atoms such as 2-hydropentafluoropropene, the omega hydroperfluoroalkenes containing from 3 to 10 carbon atoms, and the omega-hydroperfluoro(alkyl vinyl ethers) in which the alkyl group contains from 1 to 5 carbon atoms. The tetrafluoroethylene polymers can be of the non-melt-fabricable type, having an extremely high molecular weight, as evidenced by a specific melt viscosity of $1 \times 10^9$ poise or more measured at 380° C. at a shear stress of 6.5 psi or can be of the melt fabricable type having a melt viscosity of from $1 \times 10^3$ to $1 \times 10^6$ poise under the same conditions. Preferably, the polymer is polytetrafluoroethylene.

The polymers are preferably prepared by the aqueous dispersion method for preparing tetrafluoroethylene polymers in which sufficient ionic dispersing agent is present in the polymerization mixture to maintain the polymer particles in dispersion. The tetrafluoroethylene polymer dispersion can be used as prepared or redispersed in water using a suitable dispersing agent. A suitable dispersing agent in an amount of up to about 6% based on polymer may be present.

The water-soluble, polyhydrolyzable silane is preferably one in which $R_1$ is aminoalkyl or substituted amino alkyl. Representative of these amino alkyl groups are —CH$_2$—CH$_2$CH$_2$NH$_2$, —CH$_2$—(CH$_2$)$_2$NH(CH$_2$)$_2$NH$_2$, —CH$_2$—(CH$_2$)$_3$N(CH$_3$)$_2$, and the like. The term lower alkyl means alkyl of 1-6 carbon atoms. Representative silanes include γ-aminopropyl triethoxy silane; (N,N-dimethyl-3-amino propyl trimethoxy silane; N-trimethoxy silylpropyl-N,N,N-trimetyl ammonium chloride; 3(N-styryl methyl-2-aminoethyl)aminopropyl trimethoxysilane hydrochloride; and the like. Preferably, the silane will be present in an amount between 3-12%.

The siloxane is preferably one of the formula

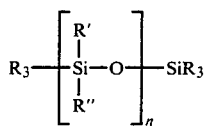

wherein R' and R" are each independently a hydrocarbyl group of 1-20 carbon atoms and one of R' and R" can be hydrogen, n is an integer of between about 5 and 5000, preferably between 10 and 2000 and most preferably between 10 and 100 and R is lower (i.e., 1-4 carbon atoms) alkyl or phenyl, and wherein the polysiloxane can be a homopolymer of a copolymer with another polysiloxane having different hydrocarbyl R' and R" substituents. More preferably R' and R" are each independently alkyl or 1-10 carbon atoms, aryl of 6-10 carbon atoms, alkaryl of 7-11 carbon atoms, or aralkyl of 7-11 carbon atoms. Preferably, the siloxane is present in an amount of between 3-12%.

The polymers of a fluorinated ester of acrylic acid used herein are water-repellant additives and are commonly referred to as fluorinated acrylate polymers (including methacrylate). Such polymers include "Zepel" fluorinated water-repellant polymers, and the like. The fluorination of the ester group is generally in the form of a perfluoroalkyl group containing from 3 to 12 carbon atoms. The polymers can be homopolymer or copolymers, including segmented copolymers, with other copolymerizable monomers, with the ester repeat unit which supplies the water repellancy to the polymer being generally represented by the formula

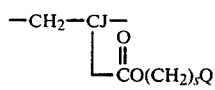

wherein J is H or CH$_3$, s is an integer of 1 to 12, and Q is an organic group which contains a perfluoroalkyl group of 3 to 12 carbon atoms. Examples of monomers from which this repeat unit is derived by polymerization (or copolymerization) are as follows:

CH$_2$=CHCOOCH$_2$CH$_2$(CF$_2$)$_2$CF$_3$,

CH$_2$=CHCOOCH$_2$CH$_2$(CF$_2$)$_4$CF$_3$,

CH$_2$=CHCOOCH$_2$CH$_2$(CF$_2$)$_8$CF$_3$,

CH$_2$=CHCOO(CH$_2$)$_{11}$(CF$_2$)$_7$CF$_3$,

CH$_2$=C(CH$_3$)COOCH$_2$CH$_2$N(CH$_3$)SO$_2$(CF$_2$)$_7$CF$_3$,

CH$_2$=CHCOOCH$_2$CH$_2$N)CH$_2$CH$_2$CH$_3$)SO$_2$(CF$_2$)$_7$CF$_3$, and

CH$_2$=C(CH$_3$)COOCH$_2$CH$_2$(CF$_2$)$_5$CF$_3$.

These water-repellant additives are soluble in some organic solvents and are generally available as an aqueous dispersion which can conveniently be added to the PTFE aqueous dispersion to form a co-dispersion. Preferably, the fluorinated acrylate polymer will be present in an amount of between 3-12%.

The polyethylene oxide surfactant employed in the dispersions is available commercially. 1-12% by weight, preferably 2-6% can be used in the dispersions.

To prepare the coating dispersions of this invention, the silane, siloxane, fluorinated acrylate polymer and polyethylene oxide surfactant are generally added to an aqueous dispersion of the tetrafluoroethylene polymer. Neither temperature nor pressure are critical during the preparation.

The glass fabric to which coating dispersions of the present invention are applied can be made of any glass such as soda-lime-silica, aluminosilicate or borosilicate, but will usually be the glass from which commercially available glass yarn is made. Typically, the glass fabric will have a sizing, such as starch, on the surface thereof. Preferably, however, the glass fabric can be cleaned of sizing such as by conventional heating procedures prior to coating, such as passing a web of glass fabric through an oven heated at about 700° C. in order to burn off the sizing, or batch heating in an oven.

To coat the glass fabric, the coating dispersion is adjusted to a solids content of 5-30% by weight, if necessary, and the fabric is conveniently dipped into the dispersion and then excess liquid is removed by passing through rollers or blades. Alternatively, the dispersion can be sprayed on one or both sides of the fabric. The coated fabric is then heated at between 100° and 340° C. to cure and dry the coating. The amount of coating on the cured and dried fabric can be between 3 and 20% by total weight and preferably is between 6 and 15%.

If desired, the coated glass fabric can be topcoated with a dispersion of the water-repellant fluorinated acrylate polymer.

EXAMPLES

In the Examples the "PTFE dispersion" employed was an aqueous dispersion of polytetrafluoroethylene containing nominally 45% solids. The "Silane" employed was γ-aminopropyl triethoxysilane (H$_2$NCH$_2$CH$_2$CH$_2$Si[OCH$_2$CH$_3$]$_3$).

The "Siloxane" employed was 35% methyl phenyl siloxane polymer emulsion.

The "Water Repellant" employed was a fluorinated acrylate copolymer dispersion.

The Applicant's Surfactant employed is C$_9$F$_{17}$O—CH$_2$CH$_2$O—$_n$CH$_3$ wherein n is predominantly 5.

The coating dispersions were prepared by adding water to the PTFE dispersion, and then adding the other ingredients. Amounts of ingredients of the coating dispersion are listed on each Example, as are % pickup of dried coating on glass fabric.

The "ZONYL ® FSN" employed is a saturated fluoroalkyl polyethylene oxide fluorosurfactant.

The "L-77" employed is a silicone surfactant.

The "Triton" X-100 is a polyoxyethylene alkyl phenol surfactant.

The "DUPONOL ® ME employed is sodium lauryl sulfate surfactant.

The "Pluronic F-68" employed is a polyoxyethylene-polyoxy propylene block copolymer surfactant.

The "Dow 710 Siloxane" is phenyl methyl polysiloxane fluid.

GENERAL PROCEDURE

In all experiments, a commercially available glass filter fabric was used. The fabric was Clark Schwebel Style 6758, CS-112 finish. The CS-112 designation refers to a fabric which has been heat cleaned to remove essentially all of the sizing.

Six-inch by six-inch pieces of fabric were immersed in the formulations and wrung partially dry through rollers. The finish was then cured by heating the fabric at 260° C. for 10 minutes. For fabrics tested as-made, strips ½-inch wide were cut. Tape was applied to the ends to prevent unraveling. The flex life in the warp direction was determined on an MIT flex tester Model 2 (Tinuis Olson Company). Fabric tension was applied using a four pound weight.

For samples tested after acid treatment, the following additional treatment was done following the curing step. The fabric samples were heated for four hours at 260° C. The samples were then immersed in a 1.0 normal sulfuric acid bath maintained at 80° C. for five minutes. The fabric samples were then dried five minutes at 260° C. The acid immersion and drying was repeated a total of four times. After the last immersion, the fabric was heated at 260° C. for one hour. Samples were tested with eight hours of this final drying.

In the following examples, all additives are expressed as a percentage of the PTFE solids present. All formulations were diluted with water to contain 15% PTFE after all additives were added unless noted.

EXAMPLE 1 AND COMPARISONS

To the PTFE dispersion was added 6% of the silane, 6% water-repellant, 6% siloxane and 3% of the indicated surfactant. All flex testing was done at 50% relative humidity.

| Example (number) or Comparison (letter) Experiment | Surfactant | MIT Flex Life, Warp | |
|---|---|---|---|
| | | As-Made | Acid Tested |
| A | "Triton" X-100 | 21,400 | 3,500 |
| 1 | Applicant's Surfactant | 59,400 | 11,900 |
| B | ZONYL ® FSN-100 | 19,400 | 4,400 |

EXAMPLE 2

The experimental procedure of Example 1 was followed except that the flex testing was done at 20% relative humidity.

| Experiment | Surfactant | MIT Flex Life, Warp | |
|---|---|---|---|
| | | As-Made | Acid Tested |
| C | "Triton" X-100 | 11,000 | 39,000 |
| 2 | Applicant's Surfactant | 16,300 | 81,000 |
| D | DUPONOL ® ME | 17,000 | 15,000 |
| E | "Pluronic" F-68 | 13,000 | 47,000 |
| F | L-77 | 28,000 | 46,000 |

EXAMPLE 3 AND COMPARISONS

In this example, the fabrics were given two coats of finish. The fabrics were cured for 10 minutes at 260° C. between coatings. The fabrics were flex tested at 31% relative humidity.

| Experiment | G | 3-1 | H | 3-2 |
|---|---|---|---|---|
| Prime Coat Composition, % | | | | |
| PTFE Solids | 7.83 | 7.83 | 7.83 | 7.83 |
| Silane | 0.30 | 0.30 | 0.30 | 0.30 |
| "Triton" X-100 | 0.22 | — | 0.22 | — |
| Applicant's Surfactant | — | 0.22 | — | 0.22 |
| Water | 91.65 | 91.65 | 91.65 | 91.65 |
| Top Coat Composition, % | | | | |
| Siloxane | 10 | 10 | — | — |
| Water | 90 | 90 | — | — |
| Dow 710 Siloxane | — | — | 3 | 3 |
| Toluene | — | — | 97 | 97 |
| Warp Flex Life, As Made | 3060 | 2660 | 3210 | 2730 |
| Warp Flex Life, Acid Treated | 1540 | 7020 | 1450 | 4070 |

In Example 1, the Applicant's Surfactant surfactant enhances the flex life both as-made and after acid treatment when tested at 50% relative humidity. In Example 2, at 20% relative humidity, the Applicant's Surfactant containing fabric has about the same life as the other fabrics as-made, but superior life after acid treatment. Acid resistance is important in a baghouse application where oxides of sulfur and nitrogen are present. The results of Example 3 are similar to Example 2.

I claim:

1. A coating dispersion which imparts resistance to attack by acidic flue gas to glass fabric coated with said dispersion, consisting essentially of
   (a) water,
   (b) 2–65% by weight tetrafluoroethylene polymer, said weight based on weight of water and polymer, said polymer being of film-forming molecular weight,
   (c) 2–60% by weight of a polyhydrolyzable silane of the formula

   $R_1Si{-}OR)_3$ wherein R is lower alkyl, preferably alkyl of 1–3 carbon atoms, and $R_1$ is phenyl or substituted lower alkyl, preferably of 1–3 carbon atoms, in which the substituents are selected from halogen, quaternary ammonium, or —NR'R" in which R' and R" are each H, lower alkyl, lower alkoxyalkyl, amino lower alkyl, hydroxyl lower alkyl, or substituted amino lower alkyl, said weight based on weight of tetrafluoroethylene polymer,
   (d) 1–20% by weight of a hydrocarbyl siloxane, said weight based on weight of tetrafluoroethylene polymer,
   (e) 1–20% by weight of a polymer of a fluorinated ester of an acrylic acid, said weight based on weight of tetrafluoroethylene polymer, and (f) 1–12% by weight of $C_9F_{17}O(CH_2CH_2O)_nR$ wherein n is an integer of 1 through 10 and R is hydrogen or alkyl of 1–10 carbon atoms, said weight based on weight of tetrafluoroethylene polymer.

2. The coating dispersion of claim 1 wherein the tetrafluoroethylene polymer is polytetrafluoroethylene.

3. The coating dispersion of claim 2 wherein the silane has the formula $R_1Si(OR)_3$ wherein R is —$CH_3$ or —$CH_2H_5$ amd $R_1$ is substituted lower alkyl in which the substituent is in the $\gamma$ position and is an amino- or amino-substituted group.

4. The coating dispersion of claim 3 wherein the silane is $\gamma$-aminopropyl triethoxy silane.

5. The coating dispersion of claim 3 wherein the silane is $\gamma$-aminopropyl trimethoxy silane.

6. The coating dispersion of claim 3 wherein the siloxane is an alkyl or alkyl/phenyl siloxane.

7. Glass fabric coated with the dispersion of claim 1, 2, 3, 4, 5 or 6, said coating being unsintered.

* * * * *